350–331

OR 3,942,872

United States

Saeva

[11] 3,942,872
[45] Mar. 9, 1976

[54] LIQUID CRYSTALLINE DISPLAY
[75] Inventor: Franklin D. Saeva, Webster, N.Y.
[73] Assignee: Xerox Corporation, Stamford, Conn.
[22] Filed: Apr. 29, 1974
[21] Appl. No.: 465,047

[52] U.S. Cl. ........... 350/160 LC; 350/150; 350/154
[51] Int. Cl.² .......................................... G02F 1/13
[58] Field of Search .............. 350/160 LC, 150, 154

[56] References Cited
UNITED STATES PATENTS
3,697,150  10/1972  Wysocki ................... 350/160 LC X
3,780,307  12/1973  Saeva et al. ............. 350/160 LC UX

*Primary Examiner*—Alfred E. Smith
*Assistant Examiner*—Matthew W. Koren
*Attorney, Agent, or Firm*—James J. Ralabate; Michael H. Shanahan; George J. Cannon

[57] ABSTRACT

The optical transitions of extrinsically optically active insoluble materials become optically active and circularly dichroic when in contact with optically negative liquid crystalline materials thereby providing unusual and highly advantageous properties. The circularly dichroic optical properties induced in the extrinsically optically active insoluble materials can be utilized for optical display applications.

11 Claims, 4 Drawing Figures

LIQUID CRYSTALLINE DISPLAY

BACKGROUND OF THE INVENTION

This information relates to liquid crystalline materials and, more specifically, to uses of compositions comprising optically negative liquid crystalline materials and insoluble extrinsically optically inactive materials which become optically active when in contact with optically negative liquid crystalline materials.

Liquid crystalline substances exhibit physical characteristics some of which are typically associated with liquids and others which are typically unique to solid crystals. The name "liquid crystals" has become generic to substances exhibiting these dual properties. Liquid crystals are known to appear in three different forms: the smectic, nematic, and cholesteric forms. These structural forms are sometimes referred to as mesophases thereby indicating that they are states of matter intermediate between the liquid and crystalline states. The three mesophase forms of liquid crystals mentioned above are characterized by different physical structures wherein the molecules of the compound are arranged in a manner which is unique to each of the three mesomorphic structures. Each of these three structures is well known in the liquid crystal art.

Some liquid crystalline substances possess optically negative characteristics. Birefringence, also referred to as double refraction, is an optical phenomenon characteristic of some solid crystals and most liquid crystal substances. When a beam of unpolarized light strikes a birefringent substance it is split into two polarized components whose transverse vibrations are at right angles to each other. The two components are transmitted at different velocities through the substance and emerge as beams of polarized light. By the term "liquid crystalline substances which have optically negative characteristics", as used herein, is meant those for which the extraordinary index of refraction $\eta_E$ is smaller than the ordinary index of refraction $\eta_o$. Cholesteric liquid crystal substances exhibit this property. For a detailed description of this phenomenon, see Optical Crystallography, Wahlstrom, Fourth Edition, Wiley and Sons, Inc., New York.

The molecules in cholesteric liquid crystals are arranged in very thin layers with the long axes of the molecules parallel to each other and to the plane of the layers within each layer. Because of the asymmetry and steric nature of the molecules, the direction of the long axes of the molecules in each layer is displaced slightly from the corresponding direction in adjacent layers. This displacement is cumulative over successive layers so that overall displacement traces out a helical path. A comprehensive description of the structure of cholesteric liquid crystals is given in Molecular Structure and the Properties of Liquid Crystals, G. W. Gray, Academic Press, 1962.

Cholesteric liquid crystals have the property that when the propagation direction of plane polarized or unpolarized light is along the helical axis thereof, i.e., when the light enters in a direction perpendicular to the long axes of the molecules, (neglecting absorption considerations), this light is essentially unaffected in transmission through thin films of such liquid crystals except for a wavelength band centered about some wavelength $\lambda_o$ where $\lambda_o = 2np$ with $n$ representing the index of refraction of the liquid crystal substance and $p$ the pitch or repetition distance of the helical structure. The bandwidth $\Delta\lambda_o$ of this wavelength band centered about $\lambda_o$ will typically be of the order of about $\lambda_o/14$. For light of a wavelength $\lambda_o$, the cholesteric liquid crystal, under these conditions, exhibits selective reflection of the light such that approximately 50% of the light is reflected and approximately 50% is transmitted, assuming negligible absorption which is usually the case, with both the reflected and transmitted beams being approximately circularly polarized in opposite directions.

For light having wavelengths around $\lambda_o$ but not at $\lambda_o$, the same effect is present but not as pronounced. The transmitted light is not circularly polarized but is instead elliptically polarized. The cholesteric liquid crystals which exhibit this property of selective reflection of light in a region centered around some wavelength $\lambda_o$ are said to be in the Grandjean or "disturbed" texture. If $\lambda_o$ is in the visible region of the spectrum, the liquid crystalline film appears to have the color corresponding to $\lambda_o$ and if $\lambda_o$ is outside the visible spectral region, the film appears colorless.

Depending upon the intrinsic rotary sense of the helix, i.e., whether it is right-handed or left-handed, the light that is transmitted in the region about $\lambda_o$ is either right-hand circularly polarized light (RHCPL) or left-hand circularly polarized light (LHCPL). The transmitted light is circularly polarized with the same sense of polarization as that intrinsic to the helix. Thus, a cholesteric liquid crystal having an intrinsic helical structure which is left-handed in sense will transmit LHCPL and one having a helical structure which is right-handed in sense will transmit RHCPL.

Hereinafter, these cholesteric liquid crystal substances will be identified in order to conform with popular convention, by the kind of light which is reflected at $\lambda_o$. When a film is said to be right-handed, it is meant that it reflects RHCPL, and when a film is said to be left-handed, it is meant that it reflects LHCPL.

A right-handed cholesteric liquid crystal substance transmits LHCPL essentially completely at $\lambda_o$ whereas the same substance reflects almost completely RHCPL. Conversely, a left-handed film is almost transparent to RHCPL at $\lambda_o$ and reflects LHCPL. Since plane polarized or unpolarized light contain equal amounts of RHCPL and LHCPL, a cholesteric liquid crystal film is approximately 50% transmitting at $\lambda_o$ for these sources when the liquid crystal is in its Grandjean texture.

A further unique optical property of optically negative liquid crystal film is that contrary to the normal situation when light is reflected, such as by mirror, where the sense of the circular polarization of the reflected light is reversed, this same phenomenon does not occur with light reflected by these liquid crystal films. The sense of the circular polarization of light reflected from these liquid crystal substances is not reversed but rather remains the same as it was before it came into contact with the liquid crystal substance. For example, if RHCPL having a wavelength $\lambda_o = 2np$ is directed at a right-hand film, it is substantially completely reflected and, after reflection, remains RHCPL. If the same light were to be directed on a metallized mirror, in reflected light would be LHCPL.

Because of these optical properties, optically negative liquid crystalline substances have been found to be highly advantageous for use in a number of applications. U.S. Pat. Nos. 3,669,525 and 3,679,290 disclose the use of such liquid crystalline materials in optical filter systems. U.S. Pat. No. 3,744,920 discloses the use of these materials in a detection system which can identify physical surface and/or electrical conductivity irregularities in a surface of interest.

Extremely large extrinsic circular dichroism has been observed within the electronic transitions of achiral (optically inactive) solutes dissolved in cholesteric mesophases as reported in recently issued U.S. Pat. No. 3,780,304 to F. D. Saeva et al. and in the following articles by F. D. Saeva et al. appearing in the Journal of the American Chemical Society (JACS): "Cholesteric Liquid-Crystal-Induced Circular Dichroism (LCICD) of Achiral Solutes. A Novel Spectroscopic Technique", Vol. 94, JACS, page 5135 (1972); "Cholesteric Liquid-Crystal-Induced Circular Dichroism (LCICD). V. Some Mechanistic Aspects", Vol. 95, JACS, page 7656 (1973); "Cholesteric Liquid-Crystal-Induced Circular Dichroism (LCICD). VI. LCICD Behavior of Benzene and Some of its Mono- and Disubstituted Derivatives", Vol. 95, JACS, page 7660 (1973); and "Cholesteric Liquid-Crystal-Induced Circular Dichroism (LCICD). VII. LCID of Achiral Solutes in Lyotropic Cholesteric Mesophases", Vol. 95, JACS, page 7882 (1973).

Circular dichroism has not been previously reported as induced in extrinsically optically active insoluble materials and it has heretobefore been thought by those working in the art as evidenced by the above articles that two mechanisms were important to the existence of Liquid Crystal Induced Circular Dichroism in dissolved materials: (1) helical organization of solute, and (2) the exposure of solute to a helical organization of liquid crystal molecules. Shortly after the invention of this Application, data was reported which indicated that mechanism (1) was not required for the observation of extrinsic LCICD within solutes in the cholesteric mesophase. That is, the solute molecules need not be ordered into helical organization by the mesophase in order to exhibit liquid crystal induced circular dichroism. The data is reported in "The Optical Activity of Achiral Molecules in a Cholesteric Solvent", J.C.S. Chem. Comm., page 712, 1973.

It is known that the pitch of cholesteric liquid crystalline substances is responsive to various foreign stimuli such as heat, pressure, electric fields, magnetic fields, etc. In some cases this characteristic is a highly desirable advantage, such as where the substance is used in a detection system to indicate the presence, or a change in the amount present, of any particular stimulus. However, according to some uses of these substances, the fact that their performance is affected by foreign stimuli is not an advantage and it would be desirable to have materials whose performance in a particular mode would be essentially independent of the presence of the above mentioned stimuli.

In rapidly growing areas of technology such as liquid crystals new methods, apparatus, compositions and articles of manufacture are often discovered for the application of the new technology in a new mode. The present invention relates to novel and advantageous uses of normally extrinsically optically inactive insoluble materials in contact with optically negative liquid crystalline materials.

SUMMARY OF THE INVENTION

It is, therefore, an object of this invention to provide an optical system having the above mentioned desirable features.

It is another object of the invention to provide an optical system employing optically negative liquid crystalline compositions which system is operative essentially independently of the presence of foreign stimuli.

It is still a further object of the invention to provide a novel optical display.

The above mentioned objects and advantages and others are realized in accordance with the invention by employing optically negative liquid crystalline substances in contact with extrinsically optically active insoluble materials whose electronic transitions, i.e., effect obtained from the interaction of light energy with the electrons of the molecules, become circularly dichroic (i.e., show a large preferential absorption of either LHCPL or RHCPL) when in contact with an optically negative liquid crystalline material. It should be understood that by the term "extrinsically optically active insoluble materials" we mean both intrinsically optically active and intrinsically optically inactive insoluble materials which are optically active or inactive, respectively, out of contact (or when not in contact) with optically negative liquid crystalline substances. Both intrinsically optically active insoluble materials and optically inactive insoluble materials become extrinsically optically active when contacted with optically negative liquid crystalline material. This extrinsic induced behavior overwhelms and dominates over any intrinsic activity since the specific rotations and molecular ellipticities in the former case are substantially larger than that observed for intrinsically optically active insoluble materials.

"Insoluble" is used herein to mean that dissolution of the material added to or contacted by the optically negative liquid crystalline material can not be detected by conventional photometric techniques, such as circular dichroism and optical absorption.

It has been found that when such extrinsically optically active insoluble materials are placed in or otherwise contacted by cholesteric mesophases, optical activity is induced in the optically inactive materials and they exhibit circularly dichroic behavior within their absorption bands. The optical behavior induced in the normally optically inactive insoluble materials is due to absorption whereas the circularly dichroic behavior of optically negative liquid crystalline substances is due to selective reflection of one type of circularly polarized light. The insoluble materials which acquire the induced optical activity, as opposed to the optically negative liquid crystalline substances, absorb both RHCPL and LHCPL; however, they show a large preference for one type more than for the other type.

Thus, such insoluble materials may be utilized in devices which can be tuned to the absorption band of the insoluble materials rather than the reflection band of the optically negative liquid crystalline substance; or use may be made of both absorption bands of such insoluble materials and reflection bands of optically negative liquid crystalline materials.

The invention will be more fully understood from the following detailed description of various preferred embodiments thereof particularly when read in conjunction with the accompanying drawings wherein.

Figure 1:
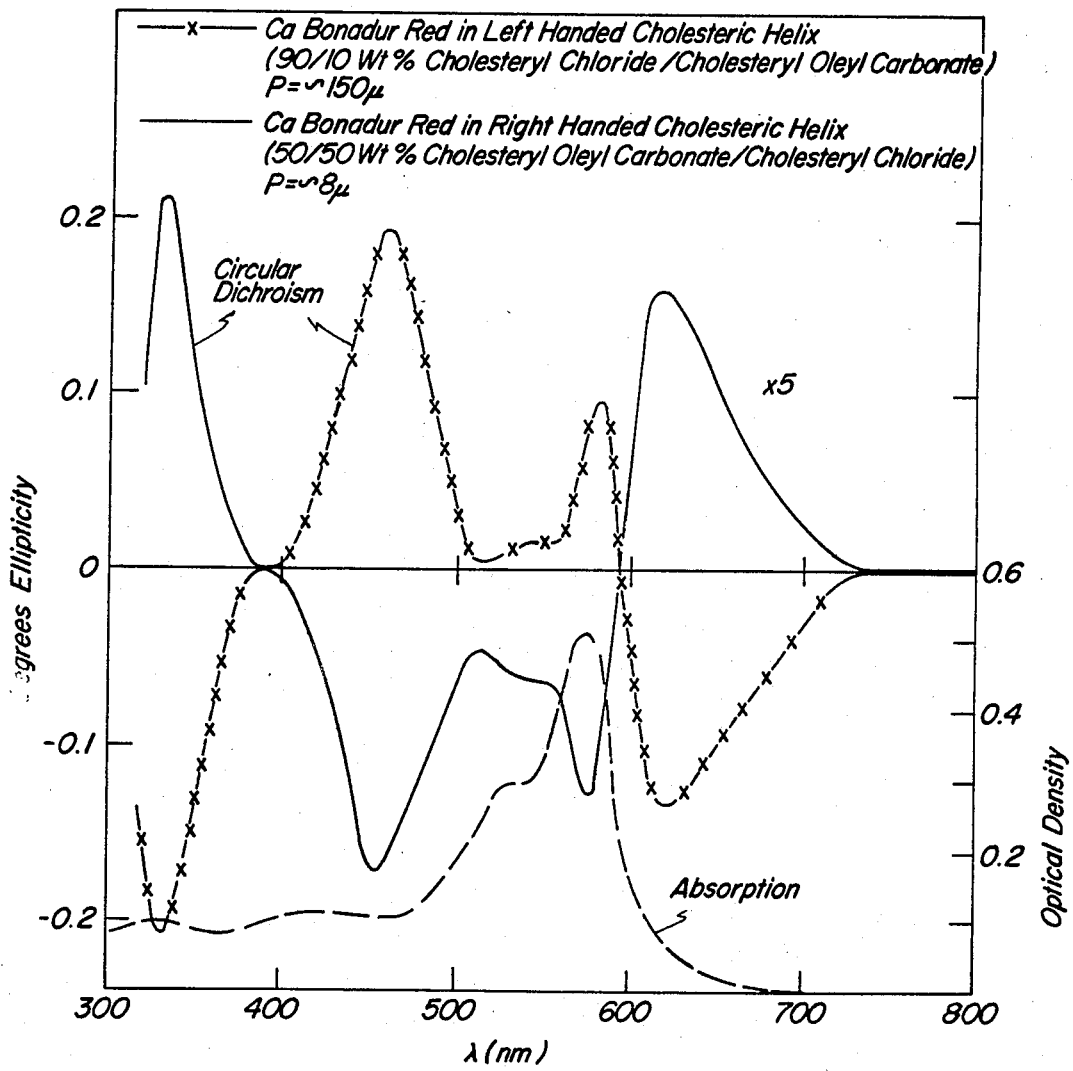
FIG. 1 shows the circular dichroism and absorption spectra of Calcium Bonadur Red particles suspended in the cholesteric mesophase of cholesteryl oleyl carbonate.

Referring now to FIG. 1, there is seen the circular dichroism and absorption spectrum of a thin film (about 10 microns thick) of insoluble Calcium Bonadur Red pigment particles suspended in the cholesteric mesophase of cholesteryl oleyl carbonate. The pigment particles are insoluble in the cholesteryl oleyl carbonate and are much larger in size than the molecules of cholesteryl oleyl carbonate. Surprisingly, it was found that the insoluble particles exhibited liquid crystal induced circular dichroism not withstanding the fact that their large size relative to the molecules of the cholesteric mesophase prevented their being ordered into helical organization by the helical array of molecules of the cholesteric mesophase.

Bands of negative sign ($E_R > E_L$) appear at about 520 and about 570 nm wavelengths of light in the circular dichroism spectrum. A major peak of absorption appears at about 580 nm of light and a shoulder at about 520 nm of light in the absorption spectrum. These wavelengths are within the visible region. As seen from the procedure of Example I, below, the absorption and circular dichroism exhibited within the visible region is attributable solely to circular dichroism induced in the particles. It was further found, as seen from comparing particles sizes in Examples 1 and 2, below, that the phenomenon of circular dichroism induced in the particles is a surface phenomenon. The ratio of circular dichroism to optical density increases in intensity with increase in surface area provided by the particles. That is, for the same weight amount of insoluble particles suspended in the cholesteric mesophase, a greater ratio is exhibited by smaller sized particles than by larger sized particles. The sign of extrinsic circular dichroism in the particles is independent of the position of the cholesteric pitch band $\lambda_o$.

Figure 2:
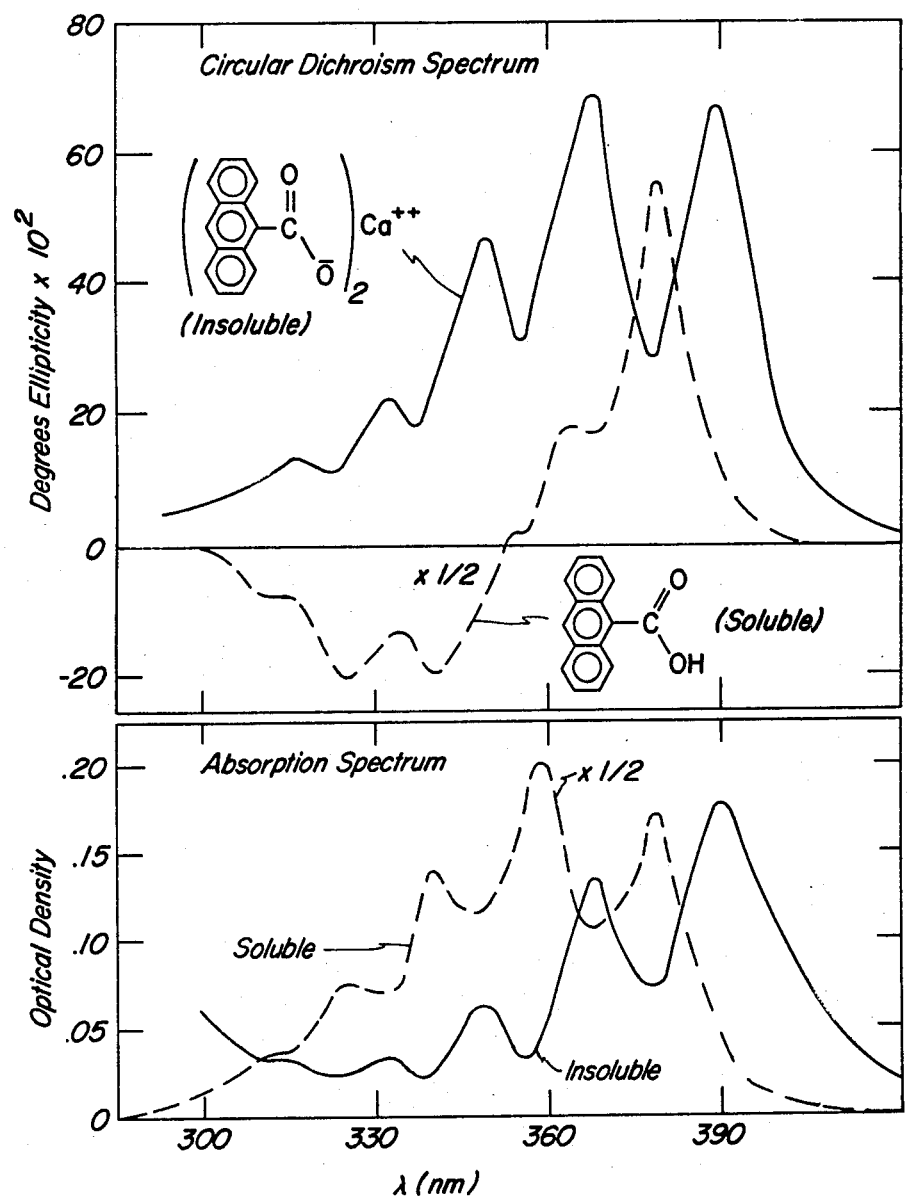
FIG. 2 shows the circular dichroism and absorption spectra of soluble and insolublilized anthracene-9-carboxylic acid in the cholesteric mesophase of cholesteryl chloride (60 wt. %) - cholesteryl nonanoate (40 wt. %).

FIG. 2 presents for comparison the absorption and circular dichroism spectra of soluble and insolubilized anthracene-9-carboxylic acid. It is noted that while the soluble anthracene-9-carboxylic acid in the cholesteric mesophase (60 wt. % cholesteryl chloride - 40 wt. % cholesteryl nonanoate) exhibits a change in sign in circular dichroism which is dependent upon the position of the cholesteric pitch band $\lambda_o$, the insolubilized anthracene-9-carboxylic acid remains positive in sign in circular dichroism ($E_L > E_R$) notwithstanding change in position of the cholesteric pitch band $\lambda_o$. Previously, it was observed with solutes in cholesterістics that the sign of circular dichroism induced in the solute was dependent upon the handedness of the cholesteric pitch band $\lambda_o$.

Of course, it will be recognized that the particular insoluble materials of FIGS. 1 and 2 are typical of the insoluble optically inactive materials of the invention and are used to illustrate what effect is obtained; similar results can be obtained with any of the insoluble optically inactive materials encompassed by the invention.

Experimental results with insoluble materials indicate that the intensity of the induced circularly dichroic absorption band varies with variation in pitch of the cholesteric mesophase, as well as with the chirality of the cholesteric helix. The sign of the extrinsic circular dichroism changes with chirality of the cholesteric helix. However, the sign of the extrinsic dichroism is independent of the wavelength location of the optically negative liquid crystalline pitch band $\lambda_o$ relative to the wavelength location of the absorption band of the insoluble material.

An important advantage derived from exploiting the induced circular dichroic optical activity of the absorption band of the insoluble materials contacted with the optically negative liquid crystalline material is that the absorption band will always remain substantially in the same position and will not be shifted to any significant extent by the presence of foreign stimuli. The magnitude of the optically active effect will typically change when a foreign stimulus acts upon the composition but the position of the band will not. This behavior is opposite to that of the pitch band of the optically negative liquid crystalline composition when acted upon by a foreign stimulus since, as is appreciated by those skilled in the art, the location of the pitch band changes but the amplitude thereof is always substantially the same. For example, when a stimulus acts upon the optically negative liquid crystalline environment, the pitch may become larger causing $\lambda_o$ to become larger (since $\lambda_o = 2np$).

Thus, it can be seen that the addition of extrinsically optically active insoluble materials whose absorption bands become highly optically active when in contact with an optically negative liquid crystalline environment permits a novel and highly advantageous means for tailoring the properties of optically negative liquid crystal systems to achieve novel and extremely useful results. The above mentioned additives can be used to provide a circularly dichroic absorption band for the composition.

The additives which can be placed in contact with optically negative liquid crystalline substances according to the invention should be insoluble (as previously defined) in such a liquid crystalline environment and should have optical transitions which become circularly dichroic in some region of the electromagnetic spectrum. Any suitable extrinsically optically active insoluble material can be used according to the invention. Typical suitable extrinsically optically active insoluble materials include, among others, organic and inorganic pigments, aromatic insoluble compounds such as insolubilized benzene, naphthalene, anthracene and the like; insoluble azo compounds such as insolubilized arylazonaphtols, azobenzenes, etc.; insoluble nitro compounds such as insolubilized nitrobenzene, nitroarylazonaphthols and the like; insoluble nitroso compounds such as insolubilized nitrosonaphthalene and the like; insoluble compounds such as insolubilized benzylidene aniline, etc.; insoluble carbonyl compounds such as insolubilized acetone, acetophenone, benzophenone and the like; insoluble thiocarbonyls such as insolubilized thioacetophenones, thioacetone, thiobenzophenone and the like; insoluble alkenes such as insolubilized butadiene, cyclohexane, etc.; insoluble heterocyclics such as insolubilized furans, aziridines, pyridines and the like, insoluble alkanes such as insolubilized hexane, dodecane and the like; metallic complexes; dyes such as polymethin, sulfur, indigo and anthraquinone dyes; and mixtures thereof.

Typical methods of insolubilizing include adsorbing on suitable surfaces and converting to ionic derivatives.

Generally speaking, it is preferred to use extrinsically optically active additive materials that absorb in the visible region of the spectrum such as, for example, inorganic and organic pigments in the novel compositions of the invention since the colored additives will provide preferred results when the compositions are utilized in various modes of application as will be discussed in detail hereinafter. For example, in a preferred embodiment of the invention where the compositions of the invention are employed in an imaging mode the use of colored additive materials will permit readout in the visible region of the spectrum of an image where the optical input is not in the visible spectral region of the electromagnetic spectrum.

Of course, it should be recognized that the above classes of materials are intended to be illustrative only of the insoluble additives which will provide the previously described induced behavior.

The amount of insoluble material which can be incorporated into an optically negative liquid crystalline can vary over an extremely wide range. The amount added in any particular instance is dependent primarily upon the intended use of the particular composition. For example, where it is intended to exploit the induced optical activity of the absorption band of the additive as little as up to about 10% by weight of optically inactive material can provide the induced optical activity. Of course, the upper limit of the amount of additive which can be incorporated into any particular optically negative liquid crystal composition, and which can go as high as about 90% by weight, is controlled by the requirement that the total environment must retain its optically negative liquid crystalline character after the addition of the optically inactive material.

Any suitable cholesteric liquid crystal substance, mixtures thereof or compositions having liquid crystalline characteristics may be employed in the invention. Typical suitable cholesteric liquid crystals include derivatives from reactions of cholesterol and inorganic acids, for example: cholesteryl chloride, cholesteryl bromide, cholesteryl iodide, cholesteryl fluoride, cholesteryl nitrate; esters derived from reactions of cholesteryl and carboxylic acids, for example, cholesteryl crotonate; cholesteryl nonanoate, cholesteryl hexanoate; cholesteryl formate; cholesteryl docosonoate; cholesteryl proprionate; cholesteryl acetate; cholesteryl valerate; cholesteryl vacconate; cholesteryl linolate; cholesteryl linolenate; cholesteryl oleate; cholesteryl erucate; cholesteryl butyrate; cholesteryl caproate; cholesteryl laurate; cholesteryl myristate; cholesteryl clupanodonate; ethers of cholesterol such as cholesteryl decyl ether; cholesteryl lauryl ether; cholesteryl oleyl ether; cholesteryl dodecyl ether; carbamates and carbonates of cholesterol such as cholesteryl decyl carbonate; cholesteryl oleyl carbonate; cholesteryl methyl carbonate; cholesteryl ethyl carbonate; cholesteryl butyl carbonate; cholesteryl docosonyl carbonate; cholesteryl cetyl carbonate; cholesteryl-p-nonylphenyl carbonate; cholesteryl-2-(2-ethoxyethoxy) ethyl carbonate; cholesteryl-2-(2-butoxyethoxy) ethyl carbonate; cholesteryl-1-2-(2-methoxyethoxy) ethyl carbonate; cholesteryl geranyl carbonate; cholesteryl heptyl carbamates; and alkyl amides and aliphatic secondary amines derived from $3\beta$-amino$\Delta$5-cholestene and mixtures thereof; peptides such as poly-$\gamma$-benzyl-L-glutamate; derivatives of beta sitosterol such as sitosteryl chloride; and amyl ester of cyano benzilidene amino cinnamate. The alkyl groups in said compounds are typically saturated or unsaturated fatty acids, or alcohols, having less than about 25 carbon atoms, and unsaturated chains of less than about 5 double-bonded olefinic groups. Aryl groups in the above compounds typically comprise substituted benzene ring compounds. Any of the above compounds and mixtures thereof may be suitable for cholesteric liquid crystalline materials in the advantageous system of the present invention.

Mixtures of liquid crystals can be prepared in organic solvents such as chloroform, petroleum ether and others, which are typically evaporated from the mixture leaving the liquid crystal composition. Alternatively, the individual components of the liquid crystalline mixture can be combined directly by heating the mixed components above the isotropic transition temperature.

The above lists of typical suitable optically negative liquid crystalline substances are intended to encompass mixtures of the above. These lists are intended to be representative only and are not to be construed as being exhaustive or limiting the invention to the specific materials mentioned. Although any liquid crystalline composition having cholesteric liquid crystalline characteristics is suitable for use in the present invention, it should be recognized that various different cholesteric liquid crystal substances or mixtures thereof or combinations of cholesteric liquid crystal substances with other substances such as those mentioned above will only possess the necessary properties which make them suitable for use according to the invention at some specific temperature range which may be at room temperature or substantially below or above room temperature. However, all of the various substances, mixtures or combinations thereof will function according to the method at some temperature. Typically, the materials of the invention will be used at or near room temperature. Thus, it is preferred to employ liquid crystal substances which have a liquid crystal state at or near room temperature. Generally speaking, the liquid crystal substance will preferably be in the liquid crystal state at the desired operational temperature.

Typical suitable thicknesses of films or layers of optically negative liquid crystalline material are from about 0.5 to about 50 microns, although any thickness which will provide the desired effect can be used.

The invention will now be described further in detail by way of examples, it being understood that these are intended to be illustrative only and the invention is not limited to the conditions, materials, procedures, etc., recited therein. All parts and percentages listed are by weight unless otherwise specified.

EXAMPLE I

The calcium salt of 3'-ethyl-4'-chloro-6'-sulfonylphenylazo-2-hydroxy-3-naphthoic acid (Calcium Bonadur Red) is finely ground between two planes of ground glass to an average particle size of about 10 microns. About 0.1 gm of the particles are uniformly dispersed in about 11 gm of the cholesteric mesophase of cholesteryl oleyl carbonate. The dispersion is placed between quartz plates about 1 × 1 × 1/8 inch in dimension. The prepared sample is analyzed with a Carey 15 Spectrophotometer for absorption spectrum. The prepared sample is analyzed with a Carey 61 Spectropolarimeter for circular dichroism. FIG. 1 graphically illustrates the resulting circular dichroism spectrum.

The absorption spectrum shows a major peak at about 580 nm and a shoulder at about 520 nm. The circular dichroism spectrum shows bands of negative sign ($E_R > E_L$) at about 520 nm. The negative sign does not change with polarization of the optical transition.

The dispersion was then centrifuged and the dispersed particles thereby separated from the cholesteryl oleyl carbonate. The cholesteryl oleyl carbonate is then re-examined spectrophotometrically and shows no absorption or circular dichroism in the visible region of the spectrum. This eliminates the possibility of particles having dissolved in the carbonate and indicates that circular dichroism arises from a surface effect in the particles.

Example I demonstrates that circular dichroism can be induced in insoluble materials by dispersing same in an optically negative liquid crystalline material.

EXAMPLE II

Example I is repeated except that the particles are ground to an average particle size of about 2 microns. The ratio of circular dichroism to optical density is determined to be larger with these about 2 micron particles than with the about 10 micron particles of Example I. This buttresses the indication of Example I that the induced circular dichroism in insoluble materials is a surface phenomenon because the smaller particles present a larger surface area in contact with the optically negative liquid crystalline substance.

Except for the difference in the ratio, the same results are obtained in Example II as are obtained in Example I.

EXAMPLE III

Two samples are prepared as follows: each sample contains the cholesteric mesophase of 60% cholesteryl chloride - 40% cholesteryl nonanoate. In sample I, anthracene-9-carboxylic acid is dissolved in the mesophase. In sample II, particles of insoluble calcium anthracene-9-carboxylic acid are dispersed in the mesophase. The absorption and circular dichroism spectrums of samples I and II are determined in the manner of Example I. FIG. 2 graphically illustrates the resulting spectra.

The circular dichroism induced in the dissolved acid in sample I changes sign at about 355 nm indicating a change in polarization of the electronic transitions. The dispersed insoluble particles of calcium anthracene-9-carboxylic acid in sample II exhibit induced circular dichroism which does not change sign with polarization of the electronic transition.

The circular dichroism of insoluble particles in sample II exhibits bands which are slightly blue shifted from the absorption bands for the particles. The relative intensities of the circular dichroism bands of the particles in sample II are more similar to the relative intensities of the absorption bands of the dissolved acid in sample I than to those of the absorption bands of the insoluble particles in sample II. The sign of the circular dichroism induced in the insoluble particles of sample II is positive ($E_L > E_R$) and independent of whether $\lambda_o$ for the cholesteric mesophase is at larger or smaller wavelengths than the absorption band of the particles.

The difference in depending upon position of $\lambda_o$ between the dissolved acid in sample I and undissolved particles in sample II indicates a difference in mechanism between induced circular dichroism in solutes and induced circular dichroism in insoluble materials in intimate contact with optically negative liquid crystalline materials.

EXAMPLE IV

Vanadyl phthalocyanine (VOPC) is heated in a vacuum to sublime a film of VOPC upon a quartz disc about 1 × 1 × ⅛ inch. The VOPC film is overcoated with a layer of the cholesteric mesophase of cholesteryl oleyl carbonate (COC) which, in turn, is contacted with a glass plate to produce a glass-VOPC-COC-quartz disc sandwich.

The absorption and circular dichroism spectrum of the COC-VOPC combination was examined and circular dichroism was observed in the region of the visible electronic transitions of VOPC. This observation demonstrates that circular dichroism induced in insoluble materials in intimate contact with optically negative liquid crystalline materials is due to specific interaction between the two materials.

EXAMPLE V

Example IV is repeated except that the VOPC is replaced with copper phthalocyanine (CuPC). Circular dichroism is observed in the visible electronic transitions of CuPC.

EXAMPLE VI

Example I is followed except that Bonadur Red is replaced by copper phthalocyanine (CuPC).

The absorption spectrum shows major peaks at about 600 nm and about 690 nm. The circular dichroism spectrum shows bands of positive sign ($E_R > E_L$) at about 595 nm and about 680 nm.

The CuPC particles are centrifuged out and the liquid crystalline material re-examined spectrophotometrically; no absorption or circular dichroism in the visible region is exhibited. This eliminates the possibility that circular dichroism was exhibited by dissolved molecules rather than by insoluble particles.

EXAMPLE VII

Particles of calcium anthracene-9-carboxylic acid are dispersed in a supercooled cholesteric mesophase of 60% cholesteryl chloride - 40% cholesteryl nonanoate. The dispersion is sandwiched at a thickness of about 7 microns between two tin-oxide coated quartz discs 1 × 1 × ⅛ inch. A D.C. voltage is applied to the oxide coatings to apply an electric field across the dispersion while the dispersion is being examined for circular dichroism induced in the particles. Upon application of the field, a change in both sign and magnitude of the induced circular dichroism is observed within the absorption bands of the dispersed particles.

When about 30 volts D.C. are applied to the oxide coatings, the sign of the induced circular dichroism goes from positive to negative and the intensity is reduced by about one-third of its original value (i.e., value prior to field application).

The circular dichroism intensity is substantially completely eliminated when the applied voltage is about 400 volts D.C..

Example VII demonstrates that the application of electric fields across cholesteric mesophases in contact with an insoluble material, alters both the sign and magnitude of the induced (extrinsic) circular dichroism.

EXAMPLE VIII

Example VII is followed except that one of the tin oxide coated quartz discs is coated with tin oxide in imagewise configuration. A D.C. voltage of about 400 volts is applied to the tin oxide coatings causing a transition of the 60/40 CC-CN from optically negative characteristics to optically positive characteristics in portions thereof sandwiched between the tin oxide coatings. The anthracene-9-carboxylic acid particles suspended in the portions of the 60/40 CC-CN wherein such transition occurs exhibit no induced circular dichroism; whereas, the particles in portions of the 60/40 CC-CN which do not undergo such transitions exhibit induced circular dichroism. Thus an image of induced circular dichroism complementary to the imagewise configured tin oxide coating is formed.

EXAMPLE IX

Example VIII is followed except that the imagewise configured tin oxide coating on the one quartz disc is replaced by a tin oxide coating on a quartz disc which corresponds to background areas only. That is, the deposition of tin oxide is in a pattern complementary to that in Example VIII. Transition of the 60/40 CC-CN from optically negative characteristics to optically positive characteristics occurs in the portions thereof sandwiched between tin oxide coatings. Induced circular dichroism is not exhibited by the particles suspended in such transitioned portions but is exhibited by particles suspended in non-transitioned portions of 60/40 CC-CN (i.e., those not sandwiched between tin oxide coatings). Thus, an image of induced circular dichroism is formed which corresponds to the non tin-oxide coated areas of the quartz disc bearing the patterned deposition of tin oxide.

For a greater appreciation of the significance of comparative Example III above, reference is made to the aforementioned article by F. Saeva appearing in 95 Journal of American Chemical Society, page 7656 (1973); especially Table I and accompanying text on page 7657 wherein the dependency of liquid crystal induced circular dichroism in solutes upon helix sense of the cholesteric mesophase upon direction of electronic transition moments of solute and upon cholesteric mesophase pitch band $\lambda_o$ position relative to wavelength of absorption of solute, is discussed in detail. That article is hereby incorporated by reference.

Figure 3:
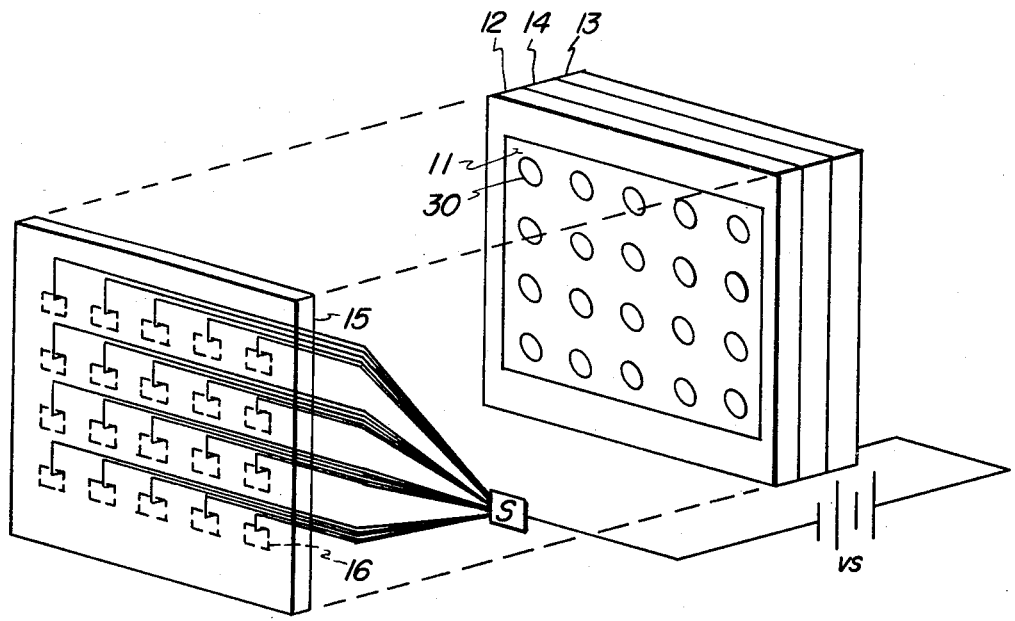
FIG. 3 is a schematic isometric partially exploded view of one embodiment of the invention.

It will be appreciated, of course, that all embodiments of the invention herein described can be used with or without application of an electrical or magnetic field, and that such usage may include selective application of an electrical or magnetic field with regard to time of application, duration of application, and area of application. It is noted that the application of electrical or magnetic field strength at or above that causing transition of the liquid crystalline material from optically negative characteristics to optically positive characteristics destroys the circular dichroism induced in extrinsically optically active materials in contact with the liquid crystalline materials FIG. 3 schematically depicts a partially exploded view of one embodiment of the invention. A film 11 of optically negative liquid crystalline material having insoluble extrinsically optically active particles 30 suspended therein is retained by protective casing 12. Plate 13 having an electrode 14 on one side thereof is placed adjacent casing 12 so that electrode 14 is in contact with film 11. Plate 15 having a matrix of discrete electrodes 16 on one side thereof is placed adjacent casing 11 so that the electrode 16 is in contact with film 11. A switch mechanism S selectively electrically connects one or more of discrete electrodes 16 to voltage source VS.

The optically negative liquid crystalline material of film 11 and the particles 30 can comprise any of the aforementioned liquid crystalline materials and extrinsically optically active materials, respectively.

Protective casing 12 and plates 13 and 15 may comprise any suitable material, flexible or rigid, which is optically isotropic and transparent to the incident light radiation and which is non-reactive with film 11. Typical suitable materials include glass, fused silica and any other materials having the required characteristics, such as quartz.

Electrodes 14 and 16 can comprise any suitable conductive material which is non-reactive with film 11. For example, typical suitable conductive materials include chrome and tin oxide.

Figure 4:
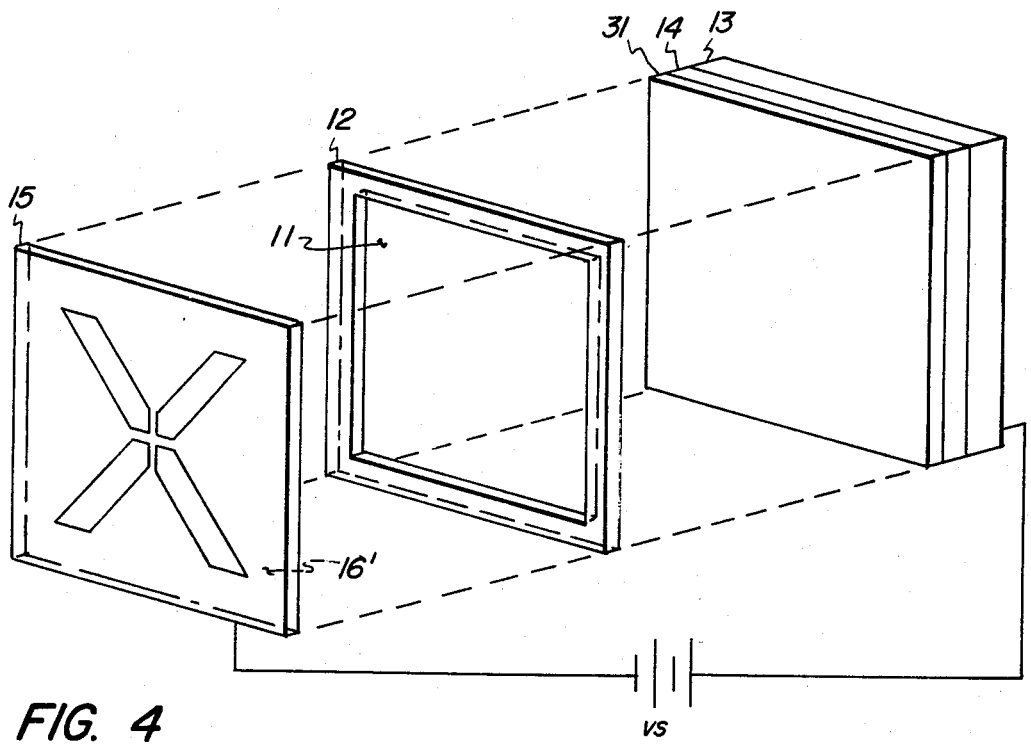
FIG. 4 is a schematic isometric view, partially exploded, of another embodiment of the invention.

FIG. 4 schematically depicts a partially exploded view of another embodiment of the invention wherein like numerals refer to like components found in FIG. 3. However, FIG. 4 depicts two variations from FIG. 3. The first is the film 31 of insoluble extrinsically optically active materials. The second variation is the configuration of electrode 16' on plate 15. Here, electrode 16' is in the range complementary to the X pattern depicted. That is, plate 15 is not covered by electrode 16' in surface areas bounded by the lines forming the individual legs of the X.

Film 31 may comprise any of the aforementioned insoluble extrinsically optically active materials and may be formed by any method suitable to the insoluble materials employed. For example, pigments such as copper phthalocyanine and vanadyl phthalocyanine are conveniently coated upon substrates by sublimation by being heated in an evacuated chamber. Other typical suitable coating methods include roll coating, reverse roll coating and coating with rods such as wire wound Mayer rods.

It is understood, of course, that FIGS. 3 and 4 are illustrative only and that particles 30 suspended in film 11 of FIG. 3 may be used with the complementary imagewise configured electrode 16' of FIG. 4; that the film 31 of insoluble material of FIG. 4 may be used with the electrodes 16 of FIG. 3; that other suitable imaging cells found in the art of imaging liquid crystalline materials by application of an electrical field may be employed provided a field strength sufficient to cause transition of the liquid crystalline material from optically negative characteristics to optically positive characteristics are employed.

As indicated by Examples VIII and IX, the circular dichroism induced in the insoluble extrinsically optically active materials by the optically negative liquid crystalline material with which it is in contact is extinguished in portions of the liquid crystalline material transformed to optically positive characteristics. Thus, any suitable technique for so transforming may be employed. For example, U.S. Pat. No. 3,652,148 herein incorporated by reference, provides a system for transforming optically negative liquid crystalline materials to an optically positive liquid crystalline mesophase by an applied electric field. This system may advantageously be employed in the practice of the instant invention.

Further, the liquid crystalline material and/or extrinsically optically active insoluble material can be shaped in imagewise configuration in FIGS. 3 and 4 and placed between uniformly coated electrodes. With the field off, the induced circular dichroism is in imagewise configuration corresponding to the shaped liquid crystalline material in which extrinsically optically active insoluble material is dispersed; and when the insoluble material is a layer shaped in image configuration, the induced circular dichroism is in imagewise configuration corresponding to the shaped layer of insoluble material. In this latter case, the liquid crystalline material need not be in imagewise configuration.

While the invention has been described in detail with respect to various preferred embodiments thereof, it is not intended to be limited thereto but rather it will be appreciated by those skilled in the art that modifications and variations are possible which are within the spirit of the invention and the scope of the claims.

For example, those skilled in the art will appreciate that the display may be conveniently viewed by employing a quarter waveplate and linear polarizer in accordance with the publication "Polarized Light" published by Polaroid Corporation, and hereby expressly incorporated by reference, particularly FIG. 7 and the accompanying description, No. FT3374A dated 2/67.

What is claimed is:

1. A method for providing a display, comprising:
   a. providing an imaging member comprising a layer of an optically negative liquid crystalline material arranged between a pair of electrodes, at least one of which is substantially transparent, said liquid crystalline material being in contact with at least one insoluble material, said insoluble material when in contact with said optically negative liquid crystalline material becoming extrinsically optically active and having an absorption band within which circular dichroism is induced, said liquid crystalline material being at a temperature in its negative-positive optical transition range;
   b. applying an imagewise configured electrical field across said layer within the optically negative-positive transition electrical field strength range of said liquid crystalline material thereby extinguishing said induced circular dichroism in imagewise configuration and leaving induced circular dichroism in a pattern complementary to said imagewise configuration; and
   c. viewing said induced circular dichroism in said complementary pattern through a circular polarizer.

2. The method as defined in claim 1 wherein said circular polarizer comprises a linear polarizer and quarter waveplate.

3. The method as defined in claim 1 wherein said insoluble material comprises a member selected from the insolubilized group consisting of aromatic compounds, azo compounds, nitro compounds, nitroso compounds, anil compounds, carbonyl compounds, thiocarbonyl compounds, alkenes, heterocyclic compounds, alkanes and mixtures thereof.

4. The method as defined in claim 1 wherein at least one of said electrodes is shaped in said imagewise configuration.

5. The method as defined in claim 1 wherein said insoluble material is dispersed within said liquid crystalline material.

6. The method as defined in claim 5 wherein the insoluble material content of said liquid crystal layer comprises up to about 90% by weight.

7. The method as defined in claim 1 wherein said insoluble material is in a layer configuration.

8. A method for providing a display, comprising:
   a. providing an imaging member comprising a layer of an optically negative liquid crystalline material shaped in image configuration between a pair of electrodes at least one of which is substantially transparent, said liquid crystalline material having dispersed therein at least one insoluble material; said insoluble material becoming extrinsically, optically active and, having a light absorption band within which circular dichroism is induced, by being in contact with said optically negative liquid crystalline material; said liquid crystalline material being at a temperature in the negative-positive transition range of said liquid crystalline material; and
   b. while viewing said imaging member through a circular polarizer, applying an electrical field across said layer within the optically negative-positive transition electrical field strength range of said liquid crystalline material.

9. The method as defined in claim 8 wherein said circular polarizer comprises a linear polarizer and a quarter waveplate.

10. A method for providing a display, comprising:
    a. providing an imaging member comprising a layer of optically negative liquid crystalline material in contact with a layer of insoluble material shaped in image configuration, said layers between a pair of electrodes at least one of which is substantially transparent, said liquid crystalline material being at a temperature in the negative-positive optical transition range of said liquid crystalline material; said insoluble material becoming extrinsically optically active and having a light absorption band within which circular dichroism is induced by contact with said optically negative liquid crystalline material; and
    b. while viewing said imaging member through a circular polarizer, applying an electrical field across said layers within the optically negative-positive transition range of said liquid crystalline material.

11. The method as defined in claim 10 wherein said circular polarizer comprises a linear polarizer and a quarter waveplate.

* * * * *